US008503446B2

(12) United States Patent
Bou-Diab et al.

(10) Patent No.: US 8,503,446 B2
(45) Date of Patent: Aug. 6, 2013

(54) MULTICAST HOST AUTHORIZATION TRACKING, AND ACCOUNTING

(75) Inventors: Bashar Said Bou-Diab, Ottawa (CA); Bijan Raahemi, Ottawa (CA); Jonathan Dean Segel, Ottawa (CA)

(73) Assignee: Alcatel Lucent, Paris (FR)

( * ) Notice: Subject to any disclaimer, the term of this patent is extended or adjusted under 35 U.S.C. 154(b) by 1167 days.

(21) Appl. No.: 11/212,870

(22) Filed: Aug. 29, 2005

(65) Prior Publication Data
US 2007/0047545 A1 Mar. 1, 2007

(51) Int. Cl.
*H04L 12/28* (2006.01)
*H04L 12/56* (2006.01)

(52) U.S. Cl.
USPC .............. 370/390; 370/229; 370/230

(58) Field of Classification Search
None
See application file for complete search history.

(56) References Cited

U.S. PATENT DOCUMENTS

| | | | | |
|---|---|---|---|---|
| 6,307,855 | B1 * | 10/2001 | Hariguchi | 370/392 |
| 6,804,236 | B1 * | 10/2004 | Mahajan et al. | 370/390 |
| 7,240,364 | B1 * | 7/2007 | Branscomb et al. | 726/9 |
| 2004/0022244 | A1 * | 2/2004 | Boers et al. | 370/390 |
| 2004/0246984 | A1 * | 12/2004 | Hundscheidt et al. | 370/432 |
| 2004/0248547 | A1 * | 12/2004 | Philsgard et al. | 455/405 |
| 2005/0165954 | A1 * | 7/2005 | Burdick et al. | 709/238 |
| 2005/0268333 | A1 * | 12/2005 | Betts et al. | 726/11 |
| 2006/0036520 | A1 * | 2/2006 | O'Neill | 705/34 |
| 2006/0146857 | A1 * | 7/2006 | Naik et al. | 370/432 |
| 2006/0221867 | A1 * | 10/2006 | Wijnands et al. | 370/255 |
| 2006/0235800 | A1 * | 10/2006 | Furlong et al. | 705/59 |

FOREIGN PATENT DOCUMENTS

| | | |
|---|---|---|
| EP | 1351445 | 10/2003 |
| EP | 1480405 | 11/2004 |
| WO | WO 03/071392 | 8/2003 |

OTHER PUBLICATIONS

Multicast & Anycast Group Membership (magma), http://www.ietf.org/html.charters/magma-charter.html, Jan. 18, 2005.
Zap-Tracking, http://www.digisoft.tv/products/zaptracking.html, Jun. 22, 2005.

* cited by examiner

*Primary Examiner* — Brandon Renner
*Assistant Examiner* — Scott M Sciacca
(74) *Attorney, Agent, or Firm* — Kramer & Amado P.C.

(57) ABSTRACT

Instead of implementing per flow measurement at every interface of every IGMP Router or Snooping Proxy in the aggregation network, as in the prior art "per flow measurement" approaches, the present invention relates to a scheme where the IGMP Router or Snooping Proxy tracks the multicast subscription of each host (for IGMPv3) or subnet (for IGMPv1 and IGMPv2) and stores the information such as host id, the time the host joined a channel, the duration of the channel delivery, etc. in a database. This database (MIB) can then be pulled by a network management tool using SNMP or WSDM MUWS. According to the invention a mechanism for multicast host authorization is also provided.

19 Claims, 2 Drawing Sheets

Multicast Host Tracking, Authorization, and Accounting Architecture

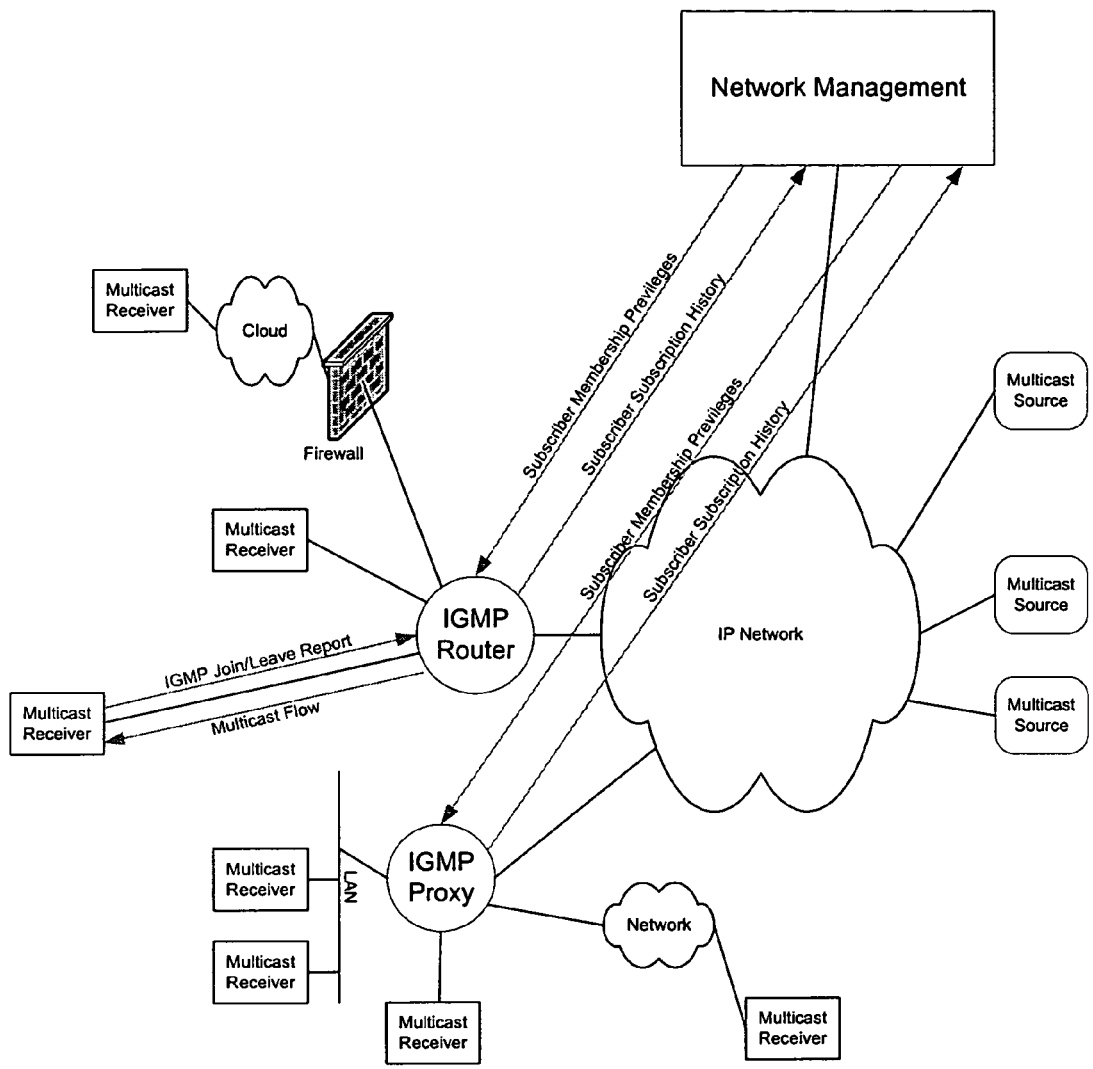
Figure 1: Multicast Host Tracking, Authorization, and Accounting Architecture

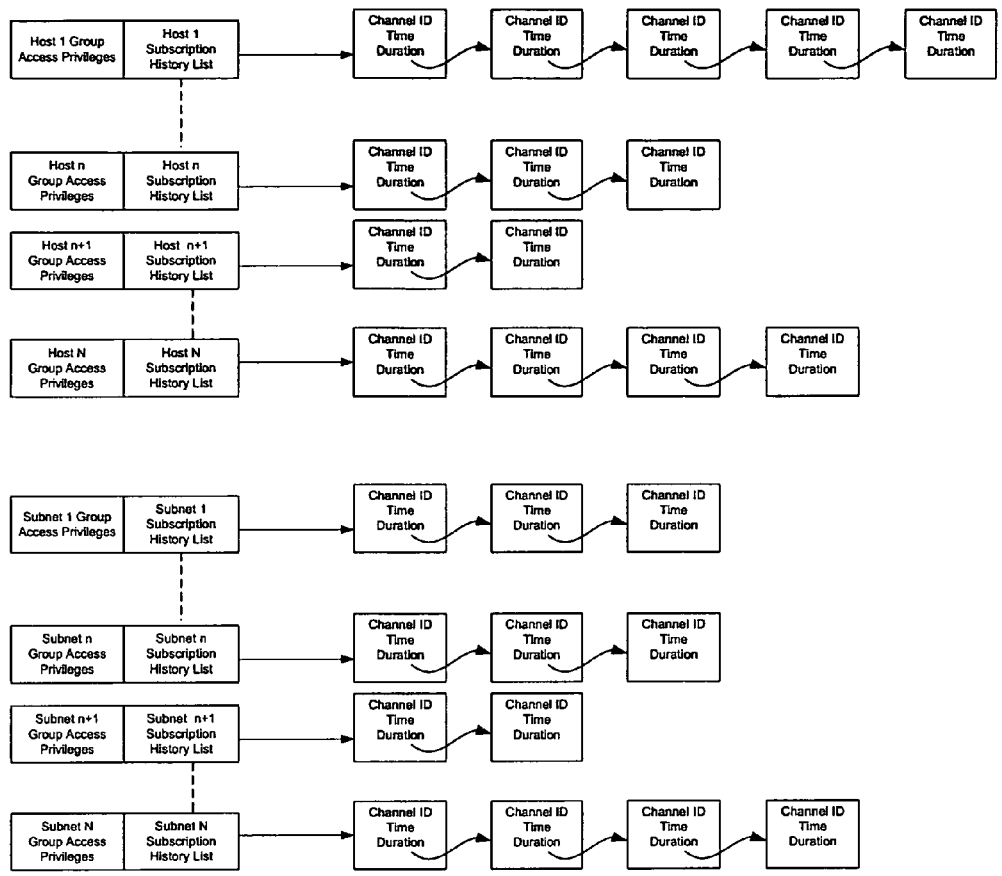
Figure 2: Host Privilege and Subscription History Storage in IGMP Router/Snooping Proxy

MULTICAST HOST AUTHORIZATION TRACKING, AND ACCOUNTING

RELATED APPLICATION

Related application entitled Multicast Flow Accounting, first filed in the USPTO on Dec. 11, 2003 under Ser. No. 10/732,529, now abandoned, addresses aspects of multicast flow accounting in which billing applies to senders of flows. The contents of the related application are incorporated herein by reference.

FIELD OF THE INVENTION

This invention relates to IP Multicast Flow accounting and, more particularly to Multicast Host Authorization, Tracking, and Accounting in digital communications systems.

BACKGROUND

Internet Protocol (IP) multicast is a bandwidth conserving technology that reduces traffic by simultaneously delivering a single stream of information to thousands of recipients, including Corporations and private homes. Applications that take advantage of IP multicast include videoconferencing, Enterprise communications, distance learning and distribution of software, stock quotes and news, amongst others.

IP multicast delivers source traffic to multiple receivers without adding any additional burden on the source or the receivers while using the least network bandwidth of any current, competing technology. Multicast packets are replicated in the network by routers enabled with supporting multicast protocols resulting in efficient delivery of data to multiple receivers in the multicast system. While multicast is a promising technology for broadcasting multimedia content, current IP multicast implementations lack ability for per host, per channel accounting, per time-of-day, and per duration accounting.

The present invention relates to a bandwidth effective mechanism employing IP multicast technology for the delivery of continuous multimedia streams such as video and audio to a group of receivers across a data network using multicast tree(s).

The closest prior art that provides similar advantages is being implemented in Set Top Boxes (STB) for Zap Tracking of TV subscribers in a Digital TV network (see DigiSoft.tv, "Dynamic Zap-Tracking™". In that model there is client software in the STB that connects to a network server and exports all user statistics to that server. The STB solution applies only to multicast streams terminated at the STB and not to multicast streams received at the subscriber Local Area Network (LAN).

A second approach is described in the aforementioned related U.S. patent application Ser. No. 10/732,529 entitled "Multicast Flow Accounting" by Pierrick Guingo, Jerome Cornet, Arnold Jansen and Fernando Cuervo. The inventors of the above identified application propose that all the network routers exchange information on the multicast traffic using a specific messaging protocol. Each end (egress) router collects the statistics (byte, packet counts) on the multicast flows it has subscribed to. Upon request of their parent, each intermediate router will collect the information about the topology of the multicast-tree, as well as the usage information from their children. To perform a measurement of the multicast flow network usage, the Source Router requests the statistics from its children, which in turn requests them from their own children, up to the end routers. The routers reply to their parent as soon as they have the statistics from their children. Therefore, the source router will get the full topology of the multicast tree along with the traffic statistics. The combination of topology and traffic statistics at the source enables accounting of the network usage by the multicast flow. The described scheme, however, does not provide host tracking and subscriber-based billing.

A third popular approach for fine grained measurement of the network usage is "per flow measurement" (Netflow, RTFM, IPFIX . . . ) see Multicast & Anycast Group Membership. However, no multicast-specific application has been created using this technology. One option to enable per flow, per subscriber, per time-of-day, per duration, per usage multicast accounting would be to implement some per flow measurement scheme at every single interface of every router in the aggregation network, and collect the statistics in a centralized fashion at granular time intervals. However, this is not scalable and requires far too much processing in the routers, and will not be considered as a viable solution if it were implemented.

The invention disclosed in the present application represents an improvement over the above referenced prior art. First, the STB based solution, typically implemented in the form of client-server middleware, has the following limitations which the present invention solves:

a) It does not provide a general multicast flow accounting solution for the network provider. It is specific to STB terminated services and is tailored for TV Service Provider. The present invention presents a general solution for multicast tracking and accounting e.g. Digital TV, Digital Radio, streaming news feeds.

b) Home firewalls might prevent an external server from querying the STB for it's zapping data or might be set up to prevent the STB from sending it's data, whereas the present network based zap tracking doesn't need to access the home network.

c) Scaling the STB based solution is costly. Multiple accounting servers are needed in the STB model to contact every STB in the network to collect multicast flow accounting information. There is no aggregation of information provided by the network, however the network based solution of the present invention relies on IGMP Proxies and Routers to aggregate information about all connected receivers.

d) The STB based solution does not provide a network fault diagnosis function, it is located on the STB. In other words, if a customer complains that he/she can not change the channels, or does not have access to a specific channel, a network based zap tracking database, which this invention allows for, might help determine if the problem is in the STB, the network, or the video server. Customers demand network fault diagnosis for multicast services.

e) Zap tracking is not a standard feature on all STBs. Most STBs do not have a channel choice tracking client, but a network based solution can track multicast subscription history regardless of what type of STB is used.

f) The STB solution is expensive. The Service provider needs to buy the middleware and either install it on all STBs that can execute the Zap Tracking software or replace STBs before a solution is realized.

g) The STB solution provides host authorization logic in the STB, which is sometimes hacked resulting in unauthorized access to Digital TV content. However the network based solution of the present invention is more resilient to hacking because it relies on IGMP Proxies and Routers to authorize host requests for multicast content.

Application Ser. No. 10/732,529 addresses a different billing model from the one targeted by this invention. While the related application allows billing of senders based on network usage, the present invention allows for billing senders or subscribers based on host channel subscription, the time of subscription and the duration of subscription to each and every multicast group (channel). Application Ser. No. 10/732, 529 does not provide enablers for billing receivers with access to multiple multicast channels based on time of viewing, and duration of viewing. It does NOT specify a method for tracking receivers. Application Ser. No. 10/732,529 aims at providing the source of a multicast channel with a map of the multicast delivery tree without addressing receiver multicast group subscription (Zap Tracking). Tracking receiver multicast group subscription is important because it provides the service provider with the time a particular viewer tuned into a certain channel (joined a multicast group) and the duration of the viewing for billing and authorization purposes. If tracking receiver multicast group subscription was to be incorporated in the approach of the above related application, the network overhead would be unacceptable because of the requirement to propagate tree changes through the network every time a subscriber changes channel (drops one multicast group and joins another).

The "per flow measurement" (Netflow, RTFM, IPFIX . . . ) approach is a generic network monitoring solution that is not well tailored for tracking multicast group subscription of multicast receivers in a highly-dynamic multicast tree. One option to enable per flow, per receiver, per time-of-day, per duration, per usage multicast accounting would be to implement some per flow measurement scheme at every single interface of every IGMP router and Snooping Proxy in the aggregation network, and collect the statistics in a centralized fashion at frequent time intervals. However, this is highly inefficient because of the network bandwidth required to transport the per flow statistics to the centralized server. It also requires far too much processing in the routers to be considered as a viable solution.

In this application the term IGMP router is used to describe a network node that is capable of processing IGMP requests. It may be known in the field as one of: IGMP multicast router; IGMP proxy; or IGMP snooping proxy

SUMMARY OF THE INVENTION

Multicast Authorization, Tracking and Accounting according to the present invention provides advantages over the prior art in support of numerous Internet based multimedia services and in particular the applications of Digital TV Broadcast and Digital Radio Broadcast. Before multimedia delivery over a multicast network is deployed, network and service operators need mechanisms for authorizing and tracking subscriber usage for proper detailed billing of subscribers. A valuable feature enabled by the invention is multicast channel profiling. For example, TV Program profiling is a useful mechanism for performance evaluation and TV schedule optimization in Digital TV services. Profiling techniques that provide detailed information with extremely low overhead are especially important for systems that continuously monitor program and viewers. The approach of the present invention enables TV program profiling and TV subscriber profiling by collecting of subscriber channel subscription information with low overhead. Multicast subscriber profiling is another valuable feature enabled by this invention through the collection of subscriber channel subscription history. The multicast subscriber profiling in the context of a Digital TV service is useful in a TV Recommender System that tracks user viewership, creates a user profile for each subscriber, and recommends programs based on the viewers profiles.

There have been multiple conflicting proposals for multicast billing models (sender-based model vs. receiver-based model) and the pricing models (flat rate vs. usage-based billing). The multicast flow accounting proposed removes the technical barriers that currently prevent some of these pricing and billing models from being adopted.

This invention aims at facilitating the tracking of multicast host subscriptions to multicast flows by enabling a network operator to determine for each Multicast Flow: the number of hosts of the flow at any instant in time, the identities of hosts of the flow at any instant in time, the date and time of day the multicast flow was delivered to each of the hosts, and the duration the flow was delivered to each of the hosts. All this tracking information is collected by the Network Management System (NMS) with minimal network bandwidth overhead.

Therefore, in accordance with a first aspects of the invention there is provided a method of tracking multicast subscription of distributed multicast receivers in an IP multicast implementation comprising the steps of: configuring a Network Management System (NMS) with identification information respecting the distributed multicast receivers and Internet Group Membership Protocol (IGMP) routers associated with the receivers; recording, at the IGMP routers, subscription related information respecting the distributed receivers; and sending the subscription related information to a central repository upon request.

In accordance with a second aspect of the invention there is provided a method of performing authorization for distributed multicast receivers requesting subscription to multicast channels in an IP multicast implementation comprising the steps of: configuring a Network Management System (NMS) with identification of the distributed receivers and IGMP routers associated with the receivers, the IGMP routers having access privilege information associated with the multicast receivers; receiving, at one of said routers, a multicast request from a downstream receiver; and providing authorization to said downstream receiver if said downstream receiver has the required access privileges.

In a preferred embodiment of this aspect of the invention access privileges define what channels the downstream receiver is allowed to request and the number of channels a receiver may receive at the same time. A call to a Session Admission Control (SAC) software module may be made for verification to determine whether the bandwidth needed to provide the requested channel is available.

Further, in the case of an authorization failure, the IGMP router either: a) sends the requesting receiver an authorization failure message with an error code corresponding to the particular failure; or b) subscribes the receiver to a synthesized channel that displays the authorization failure and its reason to the user.

Systems for implementing the above methods are also provided in accordance with separate aspects of the invention.

In accordance with a further aspect of the invention there is provided a central repository for storing usage statistics collected at an IGMP router respecting distributed receivers in an IP multicast implementation, the central repository storing receiver identification, receiver access privileges, subscription history, usage history and service management attributes in a Management Information Database.

BRIEF DESCRIPTION OF THE DRAWINGS

The invention will now be described in greater detail with reference to the attached drawings wherein:

FIG. 1 illustrates a Multicast host tracking, authorization, and accounting architecture according to the present invention; and FIG. 2 provides an example of the manner in which an IGMP Router Snooping Proxy stores information.

DETAILED DESCRIPTION OF THE INVENTION

The invention defines systems and methods for multicast receiver tracking and accounting with provision for network-based host authorization.

The Host Tracking and Accounting method described herein is based primarily on IGMPv3 (Internet Group Membership Protocol version 3), however, it can also be used with IGMPv1 and IGMPv2. IGMPv3, in a similar manner to IGMPv1 and IGMPv2, provides a mechanism for an Internet host to join a multicast group of interest. Also IGMPv2 and IGMPv3 allow a host to explicitly leave a multicast group. Both IGMPv1 and IGMPv2 support Host Report Suppression and prevent an IGMP Router from accurately determining the number of hosts on a subnet listening to a multicast group. However, IGMPv3 prevents Host Report Suppression and allows an IGMPv3 router or an IGMPv3 Snooping Proxy to track IGMPv3 hosts listening to multicast groups on a subnet, thus enabling the architecture described in the present application. As mentioned earlier, the invention would also work with IGMPv1 and IGMPv2 when Multicast Host Tracking and Accounting per subnet, rather than host, is desired.

Instead of implementing per flow measurement at every interface of every IGMP Router or Snooping Proxy in the aggregation network (as in prior art "per flow measurement" approaches), the present invention proposes a scheme where the IGMP Router or Snooping Proxy tracks the multicast subscription of each host (if IGMPv3 is used) or subnet (if IGMP v2 or v1 is used) and stores the information (such as host id, the time the host joined a channel, the duration of the channel delivery, etc.) in a Management Information Base (MIB) database as shown in FIG. 2. This MIB can then be pulled by a network management tool using Simple Network Management Protocol (SNMP) or Web Services Distributed Management: Management Using Web Services (WSDM MUWS). As noted previously an embodiment of the invention also includes a mechanism for multicast host authorization.

The systems and methods of the invention enforce a multicast subscriber authorization policy by permitting a particular host's subscription or by denying it. A management entity in the NMS downloads to IGMP proxies and routers subscriber authorization policy detailing the multicast group access privileges of each subscriber connected to the particular IGMP Snooping Proxy or router.

Multicast group subscription of each host is tracked by having the multicast aware routers or proxies, e.g. IGMPv3 Snooping Proxy or Router, nearest to the host collect host subscription information inferred from the host group membership requests, e.g. IGMP reports sent by the multicast host.

A management entity is incorporated in the NMS that collects host tracking information for billing and/or profiling purposes and/or further processing.

FIG. 1 illustrates the multiple entities involved in the invention. These include a Network Management entity and one or more multicast sources communicating with the IP Network. A set of IGMP Routers and/or Proxies interconnect the IP network to the distributed multicast receivers which may be hosts or subnets depending on whether IGMPv3 or IGMPv1 and IGMPv2 are implemented.

The method involves the following multiple steps to accomplish the desired features of the invention:
1—Network Management System Configuration
2—Configuration of IGMP Routers and Proxies
3—Multicast Access Authorization Enforcement
4—Tracking of multicast hosts
5—Delivery of host multicast group subscription information to a Network Management entity. These steps will now be described in greater detail.

The Network Management entity is configured with identities (IP addresses) of the IGMP Routers and Proxies that are relevant to the multicast group delivery service. The Network Management is also provided with identities of multicast hosts and their multicast group access privileges by an Authentication, Authorization, and Accounting (AAA) facility.

The Network Management configures the IGMP Routers and Proxies by distributing information about host multicast group access privileges to the relevant IGMP Routers and Snooping Proxies, such that the multicast group access privileges of a particular host is sent to only IGMP Router(s) or Snooping Proxy(s) that is/are associated with that host. The delivery of multicast privilege information from the Network Management system to the IGMP Routers and Snooping Proxies can be accomplished in many ways, such as using a menu interface, using a command-line interface, or using WSDM MUWS. The IP or MAC address can be used for host identification.

In one embodiment of the invention a software hook for calling a SAC software module (outside the scope of this invention) after the authorization function verifies that a specific receiver is authorized to receive a requested channel. The SAC module determines whether sending the requested channel to the receiver would adversely impact other services provided by IGMP router. If the SAC determines that satisfying an authorized channel request has detrimental impact on the performance of other services of the same or higher priority as the multicast service, the SAC function may deny the authorized request. The SAC function assesses if sufficient capacity is available to satisfy a channel request from a receiver. In other words, a physical access network may have limited capacity. Certain multicast channels will make use of that capacity, some channels more than others. For example video channels will occupy more bandwidth than audio, and high definition video more bandwidth than standard definition video.

Multicast Access Authorization Enforcement is effected when a multicast host expresses interest in a multicast group by sending an IGMP Report to the upstream IGMP Router/Snooping Proxy. The IGMP Router/Snooping Proxy checks the host multicast group access privileges of the requesting host. If the host has privileges to join/receive the multicast channel and the new channel request will not oversubscribe their available capacity as determined by the SAC module, the multicast flow corresponding with the multicast group is requested from the network if not already available at the IGMP Router/Snooping Proxy and delivered to the host. If the host does not have privileges to join/receive the multicast channel of interest, or there is not sufficient bandwidth to honor the new request as determined by the SAC module, then the multicast channel of interest is not delivered to the host. In addition to denying the host request, the IGMP router may optionally notify the host of the reason for request denial using either an error message with the proper denial code, using a pre-recorded media clip or a synthetic channel that explains the reason of request denial. In the case where a pre-recorded media clip is used, the media clip is stored locally at the IGMP router. In the case where the synthetic channel is used, the channel is synthesized locally at the IGMP router. That is, an end user whose video channel request has been refused will be presented with a screen (the pre-recorded media clip or synthetic channel) that gives them a meaningful error message.

Tracking of multicast hosts is implemented when a multicast host requests a multicast group by sending an IGMP Report and requests termination of a multicast group by sending an IGMP Leave Report (IGMPv2 and IGMPv3) to the upstream IGMP Router/Snooping Proxy. When a multicast group membership report that does not support host report suppression, such as IGMPv3, is used, the IGMP Router/Snooping Proxy tracks every host by recording the identity of every channel that was joined/sent by the host, the time the channel was joined/sent to the host, and the duration of the multicast channel membership/delivery to the host.

In scenarios where hosts on a subnet use IGMPv1 or IGMPv2, the IGMP Router or Snooping Proxy tracks the multicast subscription of the entire subnet where hosts are connected. This is done by recording the identity of every channel that was sent on the subnet, the time the channel was sent to the subnet, and the duration of the multicast channel delivery to the subnet.

The IGMP Router Snooping Proxy stores the required information in a manner equivalent to what is shown in FIG. 2. While the indexing to the host table may be done with a Hash function and the indexing to the subnet table may be done with a longest prefix matching function, this invention does not exclude other approaches that perform this function. As noted in FIG. 2 the MIB includes host or subnet access privilege information and subscription history lists. The MIB also includes Channel ID time and duration information for each host and subnet.

Host multicast subscription information collected by IGMP Routers and IGMP Proxies is pulled by a Network Management entity using a network management framework such as SNMP or WSDM MUWS. The messaging protocol is not specified here, but existing protocols can easily be adapted to play that role.

In summary, the invention provides many advantages in relation to Authorization, Tracking, and Accounting for multicast in general and IP Digital TV broadcast in particular. More specifically, the invention allows for accurate network-based tracking of multicast host group subscriptions. The information obtained by the IGMP Routers and IGMP Proxies in this invention allows a multimedia content provider using multicast delivery of media to study and profile multicast hosts and multicast channels. This ability is very valuable since it can be used for adjusting telecasting schedules to increase revenues. The host subscription information can also lead to better understanding and profiling of hosts where host profiles and preferences may be valuable for advertising and other purposes. Further this invention allows the enablement a session admission control function which enables the service provider to provide the maximum number of simultaneous services to a subscriber while preserving service quality because there is never over-committing of the available network capacity The invention decouples host multicast subscription authorization, accounting, and tracking from the network and the method used for delivery of a multicast flow to the multicast hosts. This is an important aspect because there are numerous ways of transporting multicast flows from the multicast sources to the IGMP Routers and Snooping Proxies.

Additionally, the invention allows for per-multicast group, per time-of-day, per duration billing to multicast content receivers or to any-to-any multicast group subscribers. This is achieved with modification of only the IGMP Routers and Proxies that are closest to the multicast hosts, typically in the aggregation network.

The invention also introduces only minimal management traffic overhead. It requires that IGMP Routers and Proxies be configured once for each host. Host tracking information is uploaded to network management only when needed and only for particular hosts of interest.

Although specific embodiments of the invention have been described and illustrated it will be apparent to one skilled in the art that numerous changes can be made without departing from the basic concept. It is to be understood, however, that such changes will fall within the full scope of the invention as defined in the appended claims.

We claim:

1. A method of tracking multicast subscription of distributed multicast devices in an Internet Protocol (IP) multicast implementation having an Internet Group Membership Protocol (IGMP) router connected to a network, a Network Management System (NMS) connected to the network, and a plurality of multicast devices connected to the IGMP router, the method comprising:
   receiving, at the IGMP router from the NMS, a multicast group access privilege associated with each of the plurality of multicast devices;
   storing, at the IGMP router, a subscription record associated with each of the plurality of multicast devices;
   receiving, at the IGMP router, a multicast group access request from a sending multicast device of the plurality of multicast devices, said multicast group access request identifying a requested multicast channel and identifying the sending multicast device;
   determining whether the sending multicast device is authorized to access the requested multicast channel based on the multicast group access privilege associated with the sending multicast device;
   if the sending multicast device is authorized to access the requested multicast channel:
     providing the requested multicast channel to the sending multicast device, and
     updating the subscription record associated with the sending multicast device so that the subscription record includes a record of the multicast group access request received from the multicast device and an identification of the multicast device;
   receiving a subscription history request from said NMS at said IGMP router; and
   sending the subscription record associated with the sending multicast device from the IGMP router to the NMS in response to the subscription history request,
   wherein the multicast group access privilege associated with the sending multicast device indicates:
   which channels the sending multicast device is allowed to request; and
   the number of channels the sending multicast device is allowed to simultaneously receive.

2. The method of claim 1, wherein the IP multicast implementation is an IGMPv3 implementation.

3. The method of claim 1, wherein the IP multicast implementation is either an IGMPv1 or an IGMPv2 implementation.

4. The method of claim 1, wherein the multicast devices are hosts.

5. The method of claim 1, wherein the multicast devices are subnets.

6. The method of claim 1, further comprising:
if the sending multicast device is not authorized to access the requested multicast channel, transmitting to the sending multicast device an authorization failure message including a code corresponding to an authorization failure type.

7. The method of claim 1, further comprising:
if the sending multicast device is not authorized to access the requested multicast channel, transmitting to the sending multicast device a synthesized channel that displays an authorization failure.

8. A method of authorizing and tracking distributed multicast devices requesting subscription to multicast channels in an Internet Protocol (IP) multicast implementation having Internet Group Membership Protocol (IGMP) routers connected to a network, a Network Management System (NMS) connected to the network, and a plurality of multicast devices connected to the IGMP routers, the method comprising:
storing, in the NMS, tracking information for each of the multicast devices and an identification for each of the IGMP routers associated with the multicast devices, wherein the tracking information comprises at least an identity of each multicast device, a time each multicast device received a requested flow, and a duration of the requested flow to each multicast device;
storing, in the NMS, a multicast group access privilege associated with each of the plurality of multicast devices, wherein the multicast group access privilege associated with a sending multicast device indicates:
which channels the sending multicast device is allowed to request, and
the number of channels the sending multicast device is allowed to simultaneously receive;
transmitting, by the NMS to each of the IGMP routers, the access privilege information for the multicast devices downstream of the IGMP routers;
transmitting, to an IGMP router, a subscription history request;
receiving, in response to the subscription history request, a subscription history including a record of a multicast group access request and an identification of an associated multicast device;
updating the tracking information for the associated multicast device based on the subscription history;
determining whether the sending multicast device is authorized to access the requested multicast channel based on the multicast group access privilege associated with the sending multicast device;
if the sending multicast device is authorized to access the requested multicast channel:
providing the requested multicast channel to the sending multicast device, and
updating the subscription record associated with the sending multicast device so that the subscription record includes a record of the multicast group access request received from the multicast device and an identification of the multicast device.

9. The method of claim 8, further comprising:
monitoring current committed services and an available network capacity, and
comparing the current committed services against the available capacity and, based on the comparing, allowing or not allowing the new session.

10. The method of claim 8, wherein the multicast devices are hosts.

11. The method of claim 8, wherein the multicast devices are subnets.

12. A system for tracking multicast subscription of distributed multicast devices in an Internet Protocol (IP) multicast implementation, comprising:
an Internet Group Membership Protocol (IGMP) router connected to a plurality of multicast devices and a Network Management System (NMS);
wherein the NMS is configured with tracking information corresponding to each of the multicast devices and to said IGMP router associated with the multicast devices, wherein the tracking information comprises at least an identity of each multicast device, a time each multicast device received a requested flow, and a duration of the requested flow to each multicast device, and
a multicast group access privilege associated with each of the plurality of multicast devices;
wherein the IGMP router is configured to:
receive, from the NMS, the multicast group access privilege associated with each of the multicast devices,
receive a multicast group access request from a sending multicast device from among the plurality of multicast devices, said multicast group access request identifying a multicast channel and identifying the sending multicast device,
determine whether the sending multicast device is authorized to access the multicast channel based on the multicast group access privilege associated with the sending multicast device,
if the sending multicast device is authorized to access the requested multicast channel:
provide the multicast channel to the sending multicast device, and
record a subscription history, based on said received multicast group access request, identifying the sending multicast device and identifying the requested multicast channel identified by said request, and
send the subscription history from the IGMP router to the NMS,
wherein the multicast group access privilege associated with the sending multicast device indicates:
which channels the sending multicast device is allowed to request; and
the number of channels the sending multicast device is allowed to simultaneously receive.

13. The system of claim 12 wherein the IGMP router is an IGMP Snooper Proxy.

14. The system of claim 12, wherein the multicast devices are hosts.

15. The system of claim 12, wherein the multicast devices are subnets.

16. A system for authorizing and tracking distributed multicast devices requesting subscription to multicast channels in an Internet Protocol (IP) multicast implementation, comprising:
an Internet Group Membership Protocol (IGMP) router connected to a plurality of multicast devices and a Network Management System (NMS);
wherein the NMS is configured with a multicast group access privilege associated with each of the plurality of multicast devices;
wherein the IGMP router is configured to:

receive, from the NMS, the multicast group access privilege associated with each of the plurality of multicast devices,
receive a multicast request from a sending multicast device of the plurality of multicast devices, said multicast request identifying said downstream multicast device and identifying a requested multicast channel;
determine whether the sending multicast device is authorized to access the requested multicast channel based on the multicast group access privilege associated with the sending multicast device, and
if the sending multicast device is authorized to access the requested multicast channel provide the requested multicast channel to the sending multicast device,
wherein the multicast group access privilege associated with the sending multicast device indicates:
which channels the sending multicast device is allowed to request; and
the number of channels the sending multicast device is allowed to simultaneously receive.

17. The system of claim 16, wherein the IGMP router is further configured to:
record a subscription history of said establishing of the new sessions, said subscription history including the identification of the downstream multicast devices sending said multicast group access requests, an identification of the requested multicast channels, and an identification of a duration of each of the new sessions; and
generate a billing information, specific to each of a plurality of said multicast devices, based on said subscription history.

18. The system of claim 16, wherein the multicast devices are hosts.

19. The system of claim 16, wherein the multicast devices are subnets.

\* \* \* \* \*